J. Sterer,

Burnishing Metals,

No. 1,205, Reissued July 2, 1861.

Witnesses.
LeRoy S. White
Ada Bartholomew

Inventor
Jeremiah Sterer

N. PETERS, PHOTO-LITHOGRAPHER, WASHINGTON, D. C.

UNITED STATES PATENT OFFICE.

JEREMIAH STEVER, OF BRISTOL, CONNECTICUT, ASSIGNOR, BY MESNE ASSIGNMENTS, TO JAS. H. ASHMEAD, E. HURLBURT, E. W. SPERRY, S. S. ROGERS, AND GREEN KENDRICK.

IMPROVEMENT IN MACHINES FOR BURNISHING METALS.

Specification forming part of Letters Patent No. 12,799, dated May 1, 1855; Reissue No. 834, dated October 11, 1859; Reissue No. 1,205, dated July 2, 1861.

*To all whom it may concern:*

Be it known that I, JEREMIAH STEVER, of Bristol, in the county of Hartford and State of Connecticut, have invented a new and useful machine which I term a "Mechanical Burnisher;" and I do hereby declare that the following, taken in connection with the drawings, is a full, clear, and exact description thereof.

Figure 1:
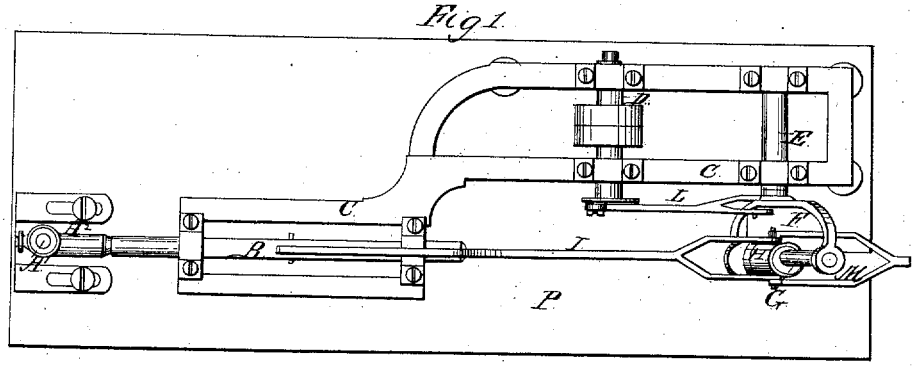
Figure 2:
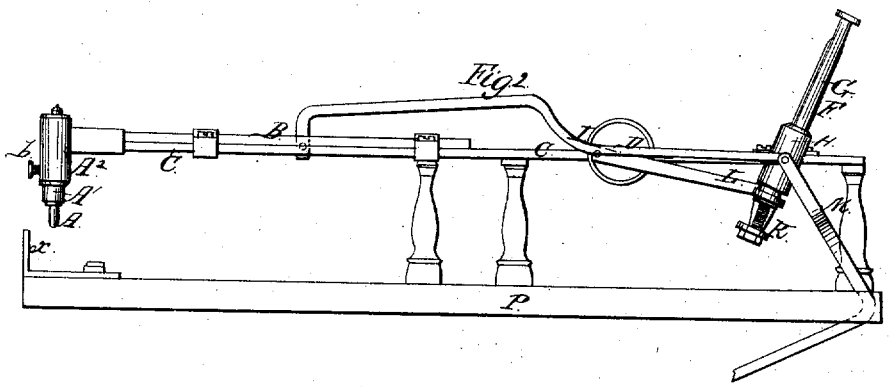
Figure 4:
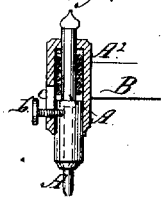
Figure 3:
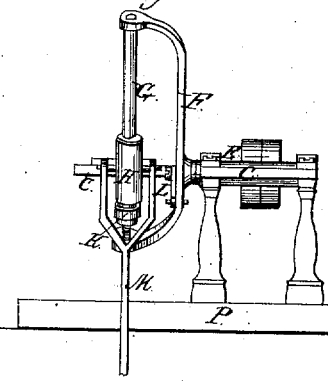

In the drawings, Figure 1 is a plan of the machine. Fig. 2 is a side elevation thereof. Fig. 3 is an end elevation, and Fig. 4 a section through the burnishing-tool and its stock.

By means of my invention spoons, forks, and other small articles of silver or plated or other metallic wares can be burnished with facility and speed without imposing upon the operator the labor of actuating the burnishing-tool, which in my machine is moved by any suitable power; and my burnisher has an enforced motion in certain directions to burnish the articles, or, in other words, to traverse the burnisher, while at the same time it is free to move in certain other directions, the surface of the burnisher and the thing to be burnished being kept in contact by a yielding pressure.

The machine represented in the drawings is one in which my invention is embodied in a simple form; and it consists of a bed-plate, P, on which are mounted four standards. These carry an upper frame, C, on which are mounted in proper journals two shafts, D and E. This frame also supports boxes or guides in which a rod, B, is free to vibrate to and fro. The shaft D is to be revolved by any proper power, and has on one end a crank-pin, to which is coupled a connecting-rod, L, which is attached by a joint to an arm, F, mounted on the rock-shaft E. This arm is bent, and its two ends are united by a rod, G, on which can slide a sleeve, H, provided with trunnions or pins, to which is attached a connecting-rod, I, whose other end is attached to the rod B. A nut, K, on a screw chased upon G serves to set the sleeve so that the trunnions may be in line with the shaft E. When so set and the shaft D is revolved, the connecting-rod I and slide B will not move; but when a fork, M, is attached to the trunnions, and by it the sleeve is lifted, then the slide B will begin to reciprocate, and its extent of reciprocation may be varied according to its elevation. This fork is usually to be connected to a treadle, so that the operator with his foot can regulate the extent of reciprocation of the slide or stop its motion, and this enforced reciprocation of a slide, and consequently of a burnishing-tool attached to it, is the whole purpose of the contrivances thus described. On the end of the slide is affixed firmly a socket, $A^2$, which incloses a tool holder or stock A′. This stock is free to slide in the socket, and is always pressed outward by a spiral spring which surrounds the stock, and is clearly shown in Fig. 4. A burnishing-tool, A, proper for burnishing metals, is inserted in the stock and held in place by a set-screw, *b*. This screw passes through a slot, *c*, in the socket $A^2$, and serves as a stop to prevent the spring throwing the tool-stock out of the socket. The tool, being thus supported, is free to move toward and away from the rest or support of the thing to be burnished. Beneath the tool upon the bed-plate is secured an adjustable rest, *x*, which is slotted and held in place by set-screws passing through the slots. The article to be burnished is to be held upon this rest by the hand of the operator, and he can turn it or roll it or move it so that all parts of its surface may be traversed by the burnisher. When a spoon-bowl, for instance, is placed upon the rest and below the burnisher and held there firmly, and the fork is actuated so as to lift the sleeve, the burnishing-tool will traverse to and fro over the surface of the bowl, and will conform to that surface, for the reason that the spring holds the tool to the surface by a yielding pressure; and by rolling or sliding the bowl by hand all parts of its surface can be burnished in succession. When nearly flat plates—such as handles of spoons or forks—are burnished, the spring is useful not only as securing the action of the burnisher over the whole surface, but also as permitting the tool to rise over beads and ornamentations; and it will also be useful where the socket has its enforced movement in lines coincident with the article to be burnished, or nearly so.

What I claim as my invention is—

The combination of these three things, viz: a tool proper for burnishing metals, and caused to traverse mechanically, a rest or support for the article to be burnished, and a contrivance for holding the tool and article to be burnished in working contact by a yielding or spring pressure, the combination being substantially such as specified.

In testimony whereof I have hereunto subscribed my name on this 2d day of April, A. D. 1861.

JEREMIAH STEVER.

In presence of—
EDWARD W. BLISS,
JEREMY W. BLISS.